Figure 1:
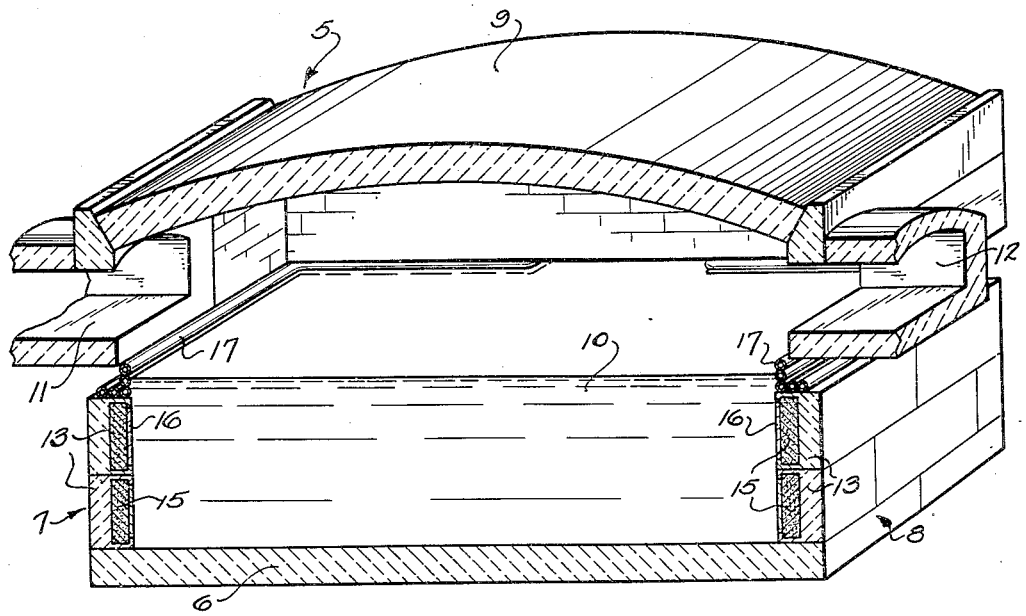

Aug. 6, 1935.  W. F. BROWN  2,010,055

FURNACE WALL CONSTRUCTION

Filed July 11, 1932

Inventor

WILBUR F. BROWN.

By Frank Fraser

Attorney

Patented Aug. 6, 1935

2,010,055

UNITED STATES PATENT OFFICE 2,010,055

FURNACE WALL CONSTRUCTION

Wilbur F. Brown, Charleston, W. Va., assignor to Libbey-Owens-Ford Glass Company, Toledo, Ohio, a corporation of Ohio Application July 11, 1932, Serial No. 621,837

11 Claims. (Cl. 49—54)

The present invention relates broadly to glass melting furnaces and more particularly to the provision of a novel and improved furnace wall construction.

In the production of molten glass according to one well known method, the glass batch ingredients are introduced into the melting tank of a relatively long continuous tank furnace wherein the ingredients are melted to form molten glass. The molten glass is then caused to flow through the refining and cooling chambers of the furnace into a working receptacle from which it may be suitably worked. The part of the furnace with which the molten glass contacts is made of a refractory clay material commonly termed "flux" clay or else of the recently developed electrically cast refractory. The molten glass gradually dissolves the refractory in which it is melted. This solution of the "tank" walls and bottom is such that after the furnace has been in operation a relatively short time, it is necessary to replace certain portions of the side walls with new clay blocks, or else to reinforce the thin parts of the walls with "water coolers". The upper portions of the furnace wall is that part of the tank where the melting is done, are the first parts of the furnace to become so thin that they must be replaced or reinforced. When the weakened walls are replaced with new clay blocks without allowing the furnace to become cold, the operation is known as a "hot repair". During a "hot repair", production is lost from the furnace. The use of water-coolers increases the gas consumption of the furnace very materially, because of the heat carried away by the circulating water.

The principal aim and object of this invention resides in the provision of a novel and improved wall construction for those portions of the furnace containing the molten glass and especially for the side walls of the melting tank, which will more effectively withstand the chemical action of the molten glass to the end that the practical life thereof will be materially lengthened.

Another object of the invention resides in the provision of such a wall construction, the inner face thereof which contacts with the molten glass being made of carbon, and further in providing inside protection for the carbon against combustion during the initial heating up of the furnace, and of outside protection for the carbon against slow combustion during the operation of said furnace.

A further object of the invention resides in the provision of such a furnace wall construction wherein the inside protection for the carbon parts consists of temporary refractory facings covering the inside surfaces thereof during the initial heating up of the furnace and which facings gradually dissolve after the glass is melted and thereby expose the carbon to direct contact with the molten glass.

Other objects and advantages of the invention will become more apparent during the course of the following description when taken in connection with the accompanying drawing.

Figure 3:
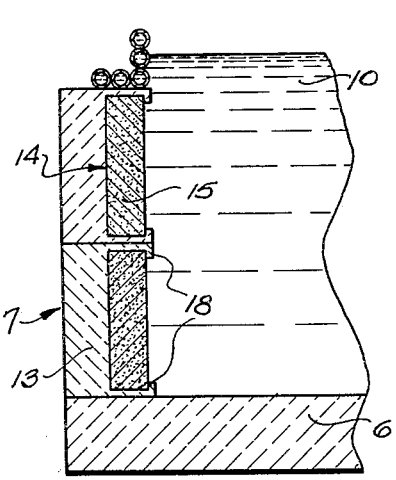
Figure 2:
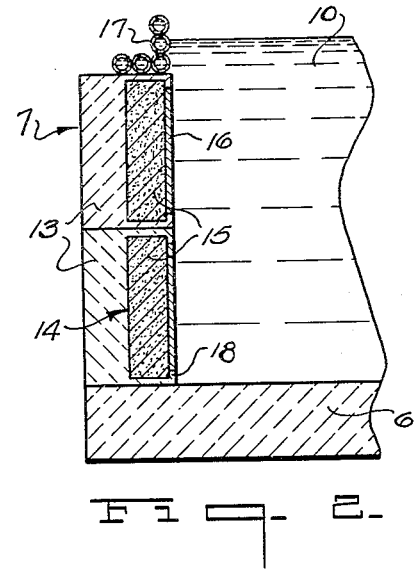

In the drawing forming a part of this application and wherein like numerals are employed to designate like parts throughout the same, Fig. 1 is a perspective sectional view through the melting end of a glass melting furnace having side walls constructed in accordance with the present invention, Fig. 2 is a transverse section showing one side wall of the furnace with the temporary refractory facings in place, and Fig. 3 is a similar view after the temporary refractory facings have been dissolved.

Referring now to the drawing, there is illustrated in Fig. 1 a glass melting furnace including a melting tank designated in its entirety by the numeral 5 and including a bottom 6, vertical side walls 7 and 8 respectively, and a cover arch 9. The batch ingredients or glass producing materials are adapted to be fed into one end of the melting tank through a so-called dog-house, and these ingredients are then melted within said tank to form the mass of molten glass 10. This molten glass is then adapted to flow from the melting tank through the refining and cooling chambers of the furnace into a working receptacle, from which the molten glass may be drawn in sheet form or worked into other glass articles as desired.

Ordinarily, the molten glass 10 is heated by means of gas flames, and these flames may be played upon the glass first from one side of the furnace and then from the other side through a plurality of oppositely disposed regenerative ports 11 and 12. In other words, the gas flame is introduced first into the furnace through the ports 11 and exhausted therefrom through the opposite ports 12, after which the flame is reversed and caused to enter through the ports 12 and exhaust through ports 11. While there has been described one way in which the furnace may be fired, it will of course be understood that the invention is not to be restricted to the specific type of heating means disclosed nor to the particular type of furnace illustrated, as it is applicable to and may be used in connection with any form of glass melting furnace.

Heretofore, it has been customary to construct the side walls 7 and 8 of the furnace from blocks formed of a refractory clay material, the molten glass coming into direct contact therewith. However, these walls of the furnace are subjected to the chemical action of the molten glass which causes them to wear away quite rapidly, necessitating frequent repairs and replacements. In accordance with the present invention, the side walls 7 and 8 of the furnace are of a novel and improved construction so that they will better withstand the action to which they are subjected. More specifically, each wall 7 and 8 is built up in the usual manner of a plurality of blocks 13 which may be formed from a suitable refractory clay material. However, the inner surfaces of these blocks are not adapted to come into direct contact with the molten glass but, on the other hand, are protected therefrom. Thus, each block 13 is hollowed out to provide a recess 14, and arranged within this recess is an insert 15 of a highly resistant and durable material such as, for example, carbon. The carbon inserts or blocks 15 may be inserted within the recesses 14 in the refractory clay blocks 13 from the ends thereof and securely held therein by the inturned lips or flanges 18.

The carbon inserts 15 will more effectively withstand the chemical action of the molten glass than would the refractory clay material of which the blocks 13 are made. As a consequence, the practical life of the walls 7 and 8 will be materially lengthened and the necessity of repairs and replacements reduced to a minimum.

It is of course well known that in the absence of oxygen, carbon is one of the most inert substances known even at high temperatures. Also, that in the event carbon is heated to a relatively high temperature in the presence of oxygen, it will oxidize or burn very rapidly. However, inasmuch as the carbon blocks or inserts 15 are arranged within recesses formed in the refractory clay blocks 13, the said clay blocks will provide outside protection therefor and prevent slow combustion of the carbon during the operation of the furnace. In other words, the refractory clay block effectively prevent the atmosphere from contacting directly with the outer side faces as well as the upper and lower edge faces of the carbon inserts.

When the furnace is first placed in operation, and during the initial heating up thereof to melt the glass batch ingredients, the inner faces of the carbon inserts are of course exposed to the atmosphere and, in the event no protection is provided therefor, there will be a great tendency for them to burn quite rapidly, due to the highly heated condition thereof. Therefore, in order to protect the carbon inserts against combustion during the initial heating up of the furnace, the inner faces of the carbon blocks 15 are adapted to be covered with more or less temporary refractory facings 16, said facings being relatively thin and being of a material which will gradually dissolve into the glass after the furnace has been heated up and placed in operation. The facings 16 are of course adapted to be formed from a material which will have as little effect upon the molten glass in the way of defects as posible when dissolved therein.

In using a continuous tank furnace of the general type referred to above, and when it is desired to draw a continuous sheet of glass therefrom, it ordinarily takes about three weeks to heat up the furnace before the sheet can be started, and it is during this heating up period that the refractory facings 16 serve to protect the carbon inserts 15. The life of the temporary refractory facing or coating for the carbon blocks would depend largely upon its composition. Preferably, however, the composition of the coating is such that it will dissolve relatively quickly, for example, within a few days after the glass level reaches it.

Although the invention is not limited to the use of any particular materials, the refractory facings may be made from a mixture of fine-ground pure sand (Potters' flint), with a small amount of binder. This binder may consist of sodium silicate, milk of lime or a plastic clay, or a mixture of any two of these or of the three. The temporary refractory facings 16 are applied to the inner faces of the carbon inserts 15 in the manner illustrated in Fig. 2 before the furnace is started, and are such that they will not dissolve into the glass until the furnace has been entirely heated up and the glass melted. However, after the furnace has been heated up and placed in operation, the chemical action of the molten glass will cause the refractory facings to gradually dissolve so as to expose the carbon inserts to direct contact with the molten glass as shown in Fig. 3. The advantages to be derived from the use of the carbon inserts over the use of the customary refractory clay blocks have been clearly set forth above. It will thus be seen that the principal features of the present invention consists first in the use of carbon inserts in direct contact with the molten glass in lieu of refractory clay blocks, and second, in providing inside protection for the carbon inserts against combustion during the initial heating up of the furnace, and of outside protection for the carbon inserts against slow combustion during the normal operation of said furnace.

If desired, the side walls 7 and 8 of the furnace may terminate slightly beneath the level of the mass of molten glass 10, and suitable pipe coolers 17 positioned thereabove although the present invention is of course not restricted to the use of such coolers, since the side walls may be continued to a point above the level of the mass of molten glass is preferred.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In combination in a glass melting furnace including a bottom, side walls and a cover arch, said side walls being constructed of refractory clay blocks, facing blocks formed of carbon carried by and substantially covering the inner surfaces of said clay blocks, and a temporary protective covering for the inner faces of said carbon blocks, said covering being of a material which will be gradually dissolved by the molten glass during the operation of the furnace and thereby expose the carbon blocks to direct contact with the molten glass.

2. In combination in a glass melting furnace including a bottom, side walls and a cover arch, said side walls being constructed of refractory clay blocks having recesses formed therein, facing blocks formed of carbon inserted within said recesses and substantially covering the entire inner surfaces of said clay blocks, and a temporary protective covering for the inner faces of said carbon blocks, said covering being of a material which will be gradually dissolved by the molten glass during the operation of the furnace and thereby expose the carbon blocks to direct contact with the molten glass.

3. In combination in a glass melting furnace including a bottom, side walls and a cover arch, said side walls being constructed of refractory clay blocks, facing blocks formed of carbon carried by and substantially covering the inner surfaces of said clay blocks, and a temporary protective covering for the inner faces of the carbon blocks comprising a relatively thin coating of a refractory material, said material being such that it will gradually dissolve into the molten glass upon operation of the furnace.

4. In combination in a glass melting furnace including a bottom, side walls and a cover arch, said side walls being constructed of refractory clay blocks having recesses formed therein, facing blocks formed of carbon inserted within said recesses and substantially covering the entire inner surfaces of said clay blocks, and a temporary protective covering for the inner faces of the carbon blocks comprising a relatively thin coating of a refractory material, said material being such that it will gradually dissolve into the molten glass upon operation of the furnace.

5. In a furnace wall construction, a plurality of outer refractory clay blocks, inner facing blocks formed of carbon carried by and substantially covering the inner surfaces of said outer blocks, and a temporary fusible covering for the inner faces of the carbon blocks.

6. In a furnace wall construction, a plurality of outer refractory clay blocks having recesses formed therein, facing blocks formed of carbon arranged within said recesses, and a temporary fusible covering for the inner faces of the carbon blocks.

7. In combination in a glass melting furnace including a bottom, side walls and a cover arch, said side walls being constructed of refractory clay blocks having recesses formed therein, facing blocks formed of carbon received entirely within said recesses and substantially covering the entire inner surfaces of said clay blocks, and a temporary protective covering for the inner faces of said carbon blocks, said covering being of a material which will be gradually dissolved by the molten glass during the operation of the furnace and thereby expose the carbon blocks to direct contact with the molten glass, the said carbon blocks terminating beneath the normal level of the molten glass in the furnace.

8. In combination in a glass melting furnace including a bottom, side walls and a cover arch, said side walls being constructed of refractory clay blocks having recesses formed therein, facing blocks formed of carbon received entirely within said recesses and substantially covering the entire inner surfaces of said clay blocks, a temporary protective covering for the inner faces of said carbon blocks, said covering being of a material which will be gradually dissolved by the molten glass during the operation of the furnace and thereby expose the carbon blocks to direct contact with the molten glass, the refractory clay blocks terminating beneath the normal level of the molten glass in the furnace, and coolers carried upon the upper edges of said clay blocks and projecting above the normal level of the molten glass.

9. In combination in a glass melting furnace including a bottom, side walls and a cover arch, said side walls being constructed of refractory clay blocks having recesses formed therein, facing blocks formed of carbon received entirely within said recesses and substantially covering the entire inner surfaces of said clay blocks, the clay blocks covering the upper and lower edges of the carbon blocks and having inturned flanges engaging the inner faces of said carbon blocks for holding the said blocks in place, and a temporary protective covering for the inner faces of said carbon blocks, said covering being of a material which will be gradually dissolved by the molten glass during the operation of the furnace and thereby expose the carbon blocks to direct contact with the molten glass.

10. In combination in a glass melting furnace including a bottom, side walls and a cover arch, said side walls being constructed of refractory clay blocks, facing blocks formed of carbon carried by and substantially covering the inner surfaces of said clay blocks, and a temporary protective covering for the inner faces of said carbon blocks, said covering being of a refractory material which will be gradually dissolved by the molten glass during the operation of the furnace and thereby expose the carbon blocks to direct contact with the molten glass.

11. In a furnace wall construction, a plurality of outer refractory clay blocks, inner facing blocks formed of carbon carried by and substantially covering the inner surfaces of said outer blocks, and a temporary fusible refractory covering for the inner faces of the carbon blocks.

WILBUR F. BROWN.